US007747608B1

(12) United States Patent
Gheorghe et al.

(10) Patent No.: US 7,747,608 B1
(45) Date of Patent: Jun. 29, 2010

(54) SYSTEMS AND METHODS FOR STRUCTURING DATABASE QUERIES

(75) Inventors: Christian Gheorghe, Wilton, CT (US); Piero Ferreri, Milan (IT)

(73) Assignee: OutlookSoft Corporation, Stamford, CT (US)

( * ) Notice: Subject to any disclaimer, the term of this patent is extended or adjusted under 35 U.S.C. 154(b) by 312 days.

(21) Appl. No.: 11/657,821

(22) Filed: Jan. 25, 2007

Related U.S. Application Data

(60) Provisional application No. 60/762,365, filed on Jan. 25, 2006.

(51) Int. Cl.
*G06F 17/30* (2006.01)

(52) U.S. Cl. ........................................ 707/713; 707/760

(58) Field of Classification Search ................. 707/1–5, 707/10, 100–104.1
See application file for complete search history.

(56) References Cited

U.S. PATENT DOCUMENTS 7,363,287 B2 * 4/2008 Kilmer et al. .................. 707/2
2004/0243593 A1 * 12/2004 Stolte et al. ................. 707/100
2007/0118501 A1 * 5/2007 Yan ............................... 707/2
2007/0118516 A1 * 5/2007 Li et al. ......................... 707/4

* cited by examiner

*Primary Examiner*—Cam-Linh Nguyen
(74) *Attorney, Agent, or Firm*—Buckley, Maschoff & Talwalkar LLC

(57) ABSTRACT

Systems and methods are provided for structuring database queries. In some embodiment, a method for querying a database to obtain desired information is provided, including forming at least one query of a first query language selected from a set of query languages and based at least in part on a set of constraints of the first query language to obtain at least part of the desired information; and forming at least one query of at least one additional query language from the set of query languages and based at least in part on a set of constraints of the at least one additional query language to obtain at least part of the desired information; wherein the at least one query of the first query language and the at least one query of the at least one additional language obtain at least all of the desired information.

34 Claims, 16 Drawing Sheets

810

| Dimension One | Dimension Two |
|---|---|
| Input | Input |
| Input | Calculated |
| Calculated | Input |
| Calculated | Calculated |

820

| ACCOUNT | ENTITY |
|---|---|
| CASH, ACCREC | ITALY, FRANCE |
| CASH, ACCREC | EUROPE |
| TOTASSETS | ITALY, FRANCE |
| TOTASSETS | EUROPE |

830

| ACCOUNT | ENTITY |
|---|---|
| CASH, ACCREC | ITALY, FRANCE |
| CASH, ACCREC | EUROPE |
| TOTASSETS | ITALY, FRANCE, EUROPE |

C = Calculated
I = Input
A = All

910

I = SQL

930

| | DIMENSIONS | | | |
|---|---|---|---|---|
| COMBINATIONS | D1 | D2 | D3 | D4 |
| **1** | I | I | I | I |
| **2** | I | I | I | C |
| 3 | I | I | C | I |
| **4** | I | I | C | C |
| 5 | I | C | I | I |
| 6 | I | C | I | C |
| 7 | I | C | C | I |
| **8** | I | C | C | C |
| 9 | C | I | I | I |
| 10 | C | I | I | C |
| 11 | C | I | C | I |
| 12 | C | I | C | C |
| 13 | C | C | I | I |
| 14 | C | C | I | C |
| 15 | C | C | C | I |
| **16** | C | C | C | C |

| | DIMENSIONS | | | |
|---|---|---|---|---|
| COMBINATIONS | D1 | D2 | D3 | D4 |
| **1** | I | I | I | I |
| **2** | I | I | I | C |
| 3 | I | I | C | I |
| **4** | I | I | C | C |
| 5 | I | C | I | I |
| 6 | I | C | I | C |
| 7 | I | C | C | I |
| **8** | I | C | C | C |
| 9 | C | I | I | I |
| 10 | C | I | I | C |
| 11 | C | I | C | I |
| 12 | C | I | C | C |
| 13 | C | C | I | I |
| 14 | C | C | I | C |
| 15 | C | C | C | I |
| **16** | C | C | C | C |

| | DIMENSIONS | | | |
|---|---|---|---|---|
| Combinations | D1 | D2 | D3 | D4 |
| 1 | I | I | I | I |
| 2 | I | I | I | C |
| | | | | |
| 3 | I | I | C | A |
| | | | | |
| | | | | |
| | | | | |
| 4 | I | C | A | A |
| | | | | |
| | | | | |
| | | | | |
| | | | | |
| | | | | |
| | | | | |
| | | | | |
| 5 | C | A | A | A |

| | |
|---|---|
| CATEGORY | ACTUAL |
| DATASRC | Input |
| INTCO | Non_IterCo |
| MEASURES | PERIODIC |
| RPTCURRENCY | LC |
| TIME | 2006.JAN |

1011

| | | SALESFRANCE | SALESITALY | SALESEUROPE |
|---|---|---|---|---|
| | | Sales France | Sales Italy | Sales Europe |
| CASH | Cash in Bank | 100.00 | 120.00 | 220.00 |
| ACCREC | Acts. Receivable | 200.00 | 350.00 | 550.00 |
| TOTALCURRNET ASSETS | Total Current Assets | 300.00 | 470.00 | 770.00 |

FIG. 10 A

```
2006 0123 18:49:40# Current EVDRE: Sheet1!$A$1
2006 0123 18:49:40# Input cells are 4 on 9 (44% Minimum required for SQL is 20%)
2006 0123 18:49:40# MEASURE:PERIODIC
2006 0123 18:49:40# Required queries are 3
2006 0123 18:49:40# 1 <II>
2006 0123 18:49:40# ------------------- [ENTITY],[ACCOUNT],[[ENTITY] in (N'SALESFRANCE',N'SALESITALY') AND [ACCOUNT] in (N'CASH',N'ACCREC') AND [CATEGORY]=N'ACTUAL' AND [DATASRC]=N'INPUT'. AND [INTCO]=N'NON_INTERCO' AND [RPTCURRENCY]=N'LC' AND [TIMEID]=N'20060100'|FINANCE

2006 0123 18:49:40# Returned records count: 6
2006 0123 18:49:40# Time to run query:0.1
2006 0123 18:49:40# 2 <IC>
2006 0123 18:49:40# -------------------
select
non empty {[ENTITY].[SALESFRANCE],[ENTITY].[SALESITALY]} on 0,
non empty {[DATASRC].[INPUT]} on 1
 from [FINANCE] where
([CATEGORY].[ACTUAL],[INTCO].[NON_INTERCO],[MEASURES].[PERIODIC],[RPTCURRENCY].[LC],[TIME].[2006.JAN],[ACCOUNT].[TOTALCURRENTASSETS])

2006 0123 18:49:40# Returned records count: 3
2006 0123 18:49:40# Time to run query:0.2
2006 0123 18:49:40# 3 <CA>
2006 0123 18:49:40# -------------------
select
non empty {[DATASRC].[INPUT]} on 0,
non empty {[ACCOUNT].[CASH],[ACCOUNT].[ACCREC],[ACCOUNT].[TOTALCURRENTASSETS]} on 1
 from [FINANCE] where
([CATEGORY].[ACTUAL],[INTCO].[NON_INTERCO],[MEASURES].[PERIODIC],[RPTCURRENCY].[LC],[TIME].[2006.JAN],[ENTITY].[SALESEUROPE])
```

| | | | | SALESITALY | SALESITALY | SALESITALY | SALESITALY | SALESFRANCE | SALESFRANCE | SALESFRANCE | SALESFRANCE | SALESEUROPE | SALESEUROPE | SALESEUROPE | SALESEUROPE |
|---|---|---|---|---|---|---|---|---|---|---|---|---|---|---|---|
| | | | | 2006, JAN | 2006, FEB | 2006, MAR | 2006, Q1 | 2006, JAN | 2006, FEB | 2006, MAR | 2006, Q1 | 2006, JAN | 2006, FEB | 2006, MAR | 2006, Q1 |
| | | | | Sales Italy | Sales Italy | Sales Italy | Sales Italy | Sales France | Sales France | Sales France | Sales France | Sales Europe | Sales Europe | Sales Europe | Sales Europe |
| | | | | 20006 JAN | 20006 FEB | 20006 MAR | 20006 Q1 | 20006 JAN | 20006 FEB | 20006 MAR | 20006 Q1 | 20006 JAN | 20006 FEB | 20006 MAR | 20006 Q1 |
| CASH | USD | Cash in Bank | US Dolar | | | | | | | | | | | | |
| CASH | EUR | Cash in Bank | EURO | | | | | | | | | | | | |
| CASH | LC | Cash in Bank | Local Currency | 120 | | | | 100 | | | | 220 | | | |
| ACCREC | USD | Accounts Receivable | US Dollar | | | | | | | | | | | | |
| ACCREC | EUR | Accounts Receivable | EURO | | | | | | | | | | | | |
| ACCREC | LC | Accounts Receivable | Local Currency | 350 | | | | 200 | | | | 550 | | | |
| TOTALCURRENTASSETS | USD | Total Current Assets | US Dollar | | | | | | | | | | | | |
| TOTALCURRENTASSETS | EUR | Total Current Assets | EURO | | | | | | | | | | | | |
| TOTALCURRENTASSETS | LC | Total Current Assets | Local Currency | 470 | | | | 300 | | | | 770 | | | |
| TOTALASSETS | USD | Total Assets | US Dollar | | | | | | | | | | | | |
| TOTALASSETS | EUR | Total Assets | EURO | | | | | | | | | | | | |
| TOTALASSETS | LC | Total Assets | Local Currency | 470 | | | | 300 | | | | 770 | | | |
| | | | | | | | | | | | | | | | |

FIG. 11 A

```
2006 0123 19:47:16# -------------------------------------------------Analyzing report...
2006 0123 19:47:16# Current EVDRE: Sheet1!$A$1
2006 0123 19:47:16# Input cells are 12 on 144 (8% Minimum required for SQL is 20%)
2006 0123 19:47:16# MEASURE:PERIODIC
2006 0123 19:47:16# No SQL allowed - use one NEXJ
2006 0123 19:47:16# --------------------
select
nonemptycrossjoin({[ENTITY].[SALESITALY],[ENTITY].[SALESFRANCE],[ENTITY].[SALESEUROPE]},{[TIME].[2006.JAN],[TIME].[2006.FEB],[TIME].[2006.MAR],[TIME].[2006.Q1]},{[ACCOUNT].[CASH],[ACCOUNT].[ACCREC],[ACCOUNT].[TOTALCURRENTASSETS],[ACCOUNT].[TOTALASSETS]},{[RPTCURRENCY].[USD],[RPTCURRENCY].[EUR],[RPTCURRENCY].[LC]},2) on 0,
nonemptycrossjoin({[ACCOUNT].[CASH],[ACCOUNT].[ACCREC],[ACCOUNT].[TOTALCURRENTASSETS],[ACCOUNT].[TOTALASSETS]},{[RPTCURRENCY].[USD],[RPTCURRENCY].[EUR],[RPTCURRENCY].[LC]},{[ENTITY].[SALESITALY],[ENTITY].[SALESFRANCE],[ENTITY].[SALESEUROPE]},{[TIME].[2006.JAN],[TIME].[2006.FEB],[TIME].[2006.MAR],[TIME].[2006.Q1]},2) on 1
from [FINANCE] where
([CATEGORY].[ACTUAL],[DATASRC].[INPUT],[INTCO].[NON_INTERCO],[MEASURES].[PERIODIC])
```

```
select
non empty CROSSJOIN(
{[TIME.[2005.JAN],[TIME].[2005.FEB],[TIME].[2005.MAR]}
{[RPTCURRENCY].[USD],[RPTCURRENCY].[EURO]}) on 0,
non empty CROSSJOIN (
{[CATEGORY].[ACTUAL],[CATEGORY].[BUDGET]},
{[DATASRC].[INPUT],[DATASRC].[ADJUSTMENT]}) on 1
from [FINANCE]
where
([ACCOUNT].[KPI100],
[ENTITY].[SALESEUROPE],
[INTCO].[NON_INTERCO],
[MEASURES][YTD])
```

1210

1220

```
select
NONEMPTYCROSSJOIN(
{[TIME]. [2005.JAN], [TIME]. [2005.FEB],[TIME].[2005.MAR]},
{[RPTCURRENCY].[USD],[RPTCURRENCY].[EURO]},
{[ACCOUNT]. [CASH], [ACCOUNT]. [ACCREC] },
{[DATASRC].[INPUT],[DATASRC].[ADJUSTMENT]},2) on 0,
NONEMPTYCROSSJOIN(
{[ACCOUNT].[CASH],[ACCOUNT].[ACCREC]},
{[DATASRC].[INPUT],[DATASRC].[ADJUSTMENT]},
{[TIME].[2005.JAN],[TIME].[2005.FEB],[TIME].[2005.MAR]},
{[RPTCURRENCY].[USD],[RPTCURRENCY].[EURO]},2) on 1
from [FINANCE]
where
([CATEGORY].[ACTUAL],
[ENTITY].[SALESEUROPE],
[INTCO].[NON INTERCO],
[MEASURES]. [PERIODIC])
```

FIG. 12

SYSTEMS AND METHODS FOR STRUCTURING DATABASE QUERIES

CROSS-REFERENCE TO RELATED APPLICATIONS

This application claims the benefit of U.S. Provisional Patent Application No. 60/762,365, filed on Jan. 25, 2006, which is hereby incorporated by reference herein in its entirety.

TECHNICAL FIELD

The present invention relates to the field of database query generation.

BACKGROUND

When a database query or set of queries is created, there may be more to consider than simply what information will be returned by the query or queries. For example, system users and administrators may care not only that the correct data is returned by a query, but that the data is returned quickly and efficiently. Many variables can affect the speed of a query, such as, for example, the hardware and/or operating system being used. However, the structure of a query (e.g., the number of queries issued, the type and/or language of a query, the structure of data in a query, etc.) can also affect the query's speed and/or scalability. Additionally, data desired from a query is often located in many locations; and because of this, obtaining all the data can be slower than desired.

SQL (Structured Query Language) and MDX (Multidimensional Expressions) are two examples of languages used for interacting with a database. One difference between SQL and MDX is the ability of MDX to reference multiple dimensions. For example, MDX provides commands that are designed specifically to retrieve data as multidimensional data structures with almost any number of dimensions (each of these dimensions is referred to as an axis).

In SQL, the SELECT clause is used to define the column layout for a query, while the WHERE clause is used to define the row layout. However, in MDX the SELECT clause can be used to define several axis dimensions, while the WHERE clause is used to restrict multidimensional data to a specific dimension or member. In SQL, the WHERE clause is used to filter the data returned by a query. In MDX, the WHERE clause is used to provide a slice of the data returned by a query. The SQL query uses the WHERE clause to contain an arbitrary list of items that should (or should not) be returned in the result set. While a long list of conditions in the filter can narrow the scope of the data that is retrieved, there is no requirement that the elements in the clause will produce a clear and concise subset of data. In MDX, however, the concept of a slice means that each member in the WHERE clause identifies a distinct portion of data from a different dimension.

The process of creating an SQL query is also different than that of creating an MDX query. The creator of an SQL query visualizes and defines the structure of a two-dimensional rowset and writes a query on one or more tables to populate it. In contrast, the creator of an MDX query usually visualizes and defines the structure of a multidimensional dataset and writes a query on a single cube to populate it. This could result in a multidimensional dataset with any number of dimensions, for example, a one-dimensional dataset is possible. These differences are at least part of the reason that, for some queries, it is faster to use SQL than MDX, while for other queries, it is not even possible to use SQL.

Accordingly, there exists a need for systems and methods that generate fast, scalable, and efficient queries that consider, for example, query structure, query language, and/or the number of queries issued.

SUMMARY

Systems and methods for structuring and generating database queries are provided. In some embodiments, methods for querying a database to obtain desired information are provided, including: forming at least one query of a first query language selected from a set of query languages and based at least in part on a set of constraints of the first query language to obtain at least part of the desired information; and forming at least one query of at least one additional query language from the set of query languages and based at least in part on a set of constraints of the at least one additional query language to obtain at least part of the desired information; wherein the at least one query of the first query language and the at least one query of the at least one additional language obtain at least all of the desired information.

In other embodiments, a database system is provided, including a database in communication with a network; an interface in communication with the network; a memory; and a processor in communication with the memory, the interface, and the database; wherein the processor: forms at least one query of a first query language selected from a set of query languages and based at least in part on a set of constraints of the first query language to obtain at least part of desired information; and forms at least one query of at least one additional query language from the set of query languages and based at least in part on a set of constraints of the at least one additional query language to obtain at least part of the desired information; wherein the at least one query of the first query language and the at least one query of the at least one additional language obtain at least all of the desired information.

In still other embodiments, a database system is provided, including: elements for forming at least one query of a first query language selected from a set of query languages and based at least in part on a set of constraints of the first query language to obtain at least part of desired information; and elements for forming at least one query of at least one additional query language from the set of query languages and based at least in part on a set of constraints of the at least one additional query language to obtain at least part of the desired information;

BRIEF DESCRIPTION OF THE DRAWINGS

FIG. 8 is a group of charts illustrating query structures that can be used in some embodiments of the present invention.

FIG. 9 is another chart illustrating query structures that can be used in some embodiments of the present invention.

FIG. 10 A illustrates an example page key and grid of data that can be populated using some embodiments of the present invention.

FIG. 10 B illustrates an example query that can be generated using some embodiments of the present invention.

FIG. 11 A illustrates an example grid of data that can be populated using some embodiments of the present invention.

FIG. 11 B illustrates an example query that can be generated using some embodiments of the present invention.

FIG. 12 illustrates further example queries that can be generated using some embodiments of the present invention.

DETAILED DESCRIPTION

Figure 1:
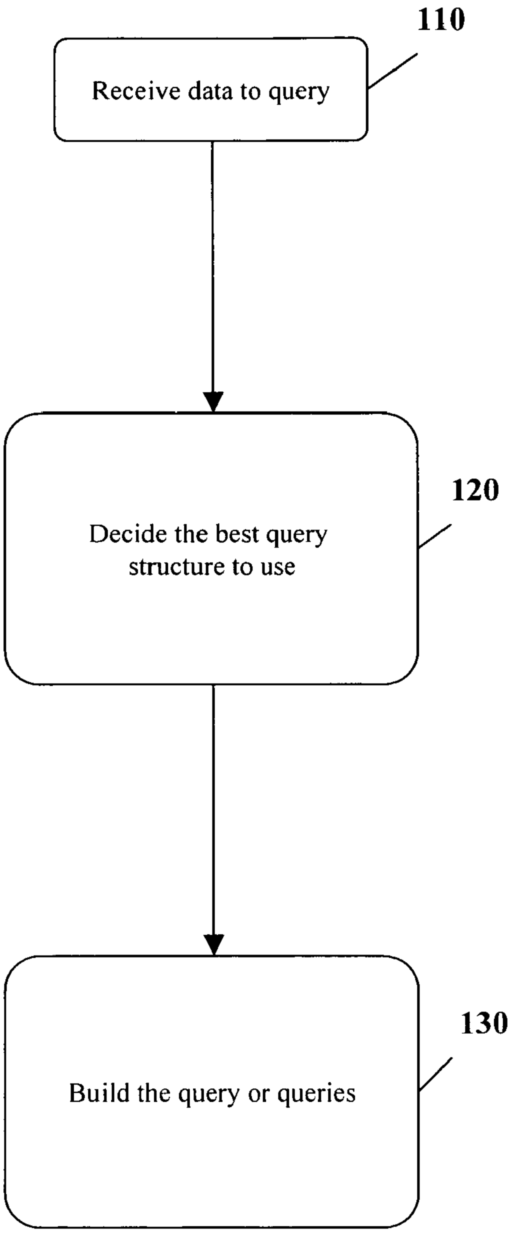
FIG. 1 is a simplified illustration of a method for structuring database queries according to some embodiments of the present invention.

In accordance with some embodiments of the present invention, systems and methods for generating and/or structuring data queries are provided. When presented with data from which to create a query or data that indicates the desired query results (both referred to herein as "data to query"), the systems and methods of the present invention can decide what query structure (e.g., the number of queries issued, the type and/or language of a query, the structure of data in a query, etc.) to use and can generate a query or queries accordingly. Query structure can be selected to, for example, improve speed and/or scalability. Different embodiments can generate queries and/or break a query into a number of queries of any appropriate language, or combination of languages, such as, for example, but not limited to, Data Manipulation Language (DML), Structured Query Language (SQL), Online Analytical Processing (OLAP) Languages, Multidimensional Expressions (MDX), Multidimensional OLAP (MOLAP), Relational OLAP (ROLAP), and/or Hybrid OLAP (HOLAP). Embodiments of the present invention can use any appropriate application program interface (API) for the languages and/or database system or systems being used. Some embodiments, when presented with data to query can bring the data into one range, which can improve the speed with which the desired data can be retrieved. A range can, for example, refer to a multi-dimensional array of data that can be retrieved at once. An overview of some embodiments of the present invention is illustrated FIG. 1. Data to query can be received at 110, query structure can be decided at 120, and the query or queries can be built or generated at 130.

Some embodiments of the present invention can rely on assumptions, stored in or accessible to the system, about the performance characteristics of the query language or languages being used. It is understood that the assumptions may not always be true. However, the assumptions can provide information that can be used in generating fast and scalable queries. In deciding the query structure, at 120, an embodiment can consider what combination of queries in what query languages is possible, and is likely to obtain the desired information, for example, in the fastest manner. Some embodiments may consider all languages at once and build the query or queries. Other embodiments may consider the languages in a particular order and proceed to another language only if the languages already considered were not selected or were only selected to obtain part of the desired data. Different embodiments may consider the languages in various orders, based on, for example, what language or languages have already been selected or what type of information still needs to be retrieved. Some embodiments may, for example, begin to issue queries as decisions are made as this may improve performance. Some embodiments may, for example, wait until the entire query structure has been decided and then form and issue all necessary queries. Some embodiments may consider a number of languages at one time and, for example, form and issue queries as languages and query structure are selected, or form and issue queries after the languages and structure needed to retrieve all the data to query have been determined.

Figure 2:
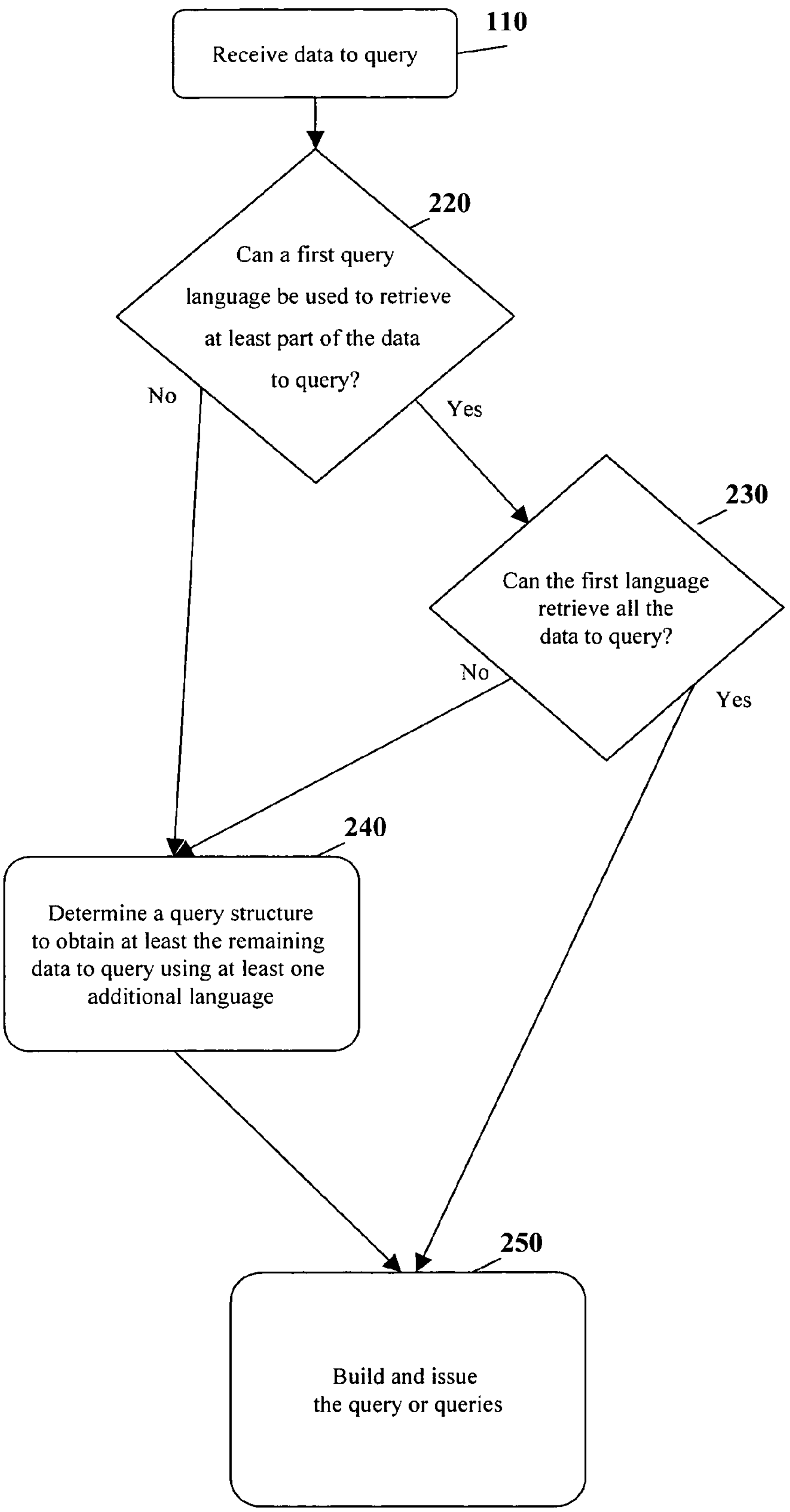
FIG. 2 is another simplified illustration of a method for structuring database queries according to some embodiments of the present invention.

As illustrated in FIG. 2, an embodiment receives data to query at 110. It can be determined, at 220, whether a first query language can be used to retrieve the desired information described by at least part of the data to query. This determination can be based, for example, upon whether it is possible, based on constraints of the first language, for a query to obtain part of the desired information. The determination can also be based, for example, upon whether it is likely that the first query language can return all the requested information faster and/or more efficiently than another query language or combination of query languages. If it is decided to use the first language, at 220, and if it is determined, at 230, that the first language can obtain all the data to query, the query or queries can be built and issued, at 250. If the first language cannot be used to obtain any of the requested information, or cannot obtain all the information, a query structure can be selected for the remaining data to query, at 240, and the query or queries can be built and issued, at 250.

The assumptions and constraints discussed below are in relation to SQL and MDX, however, embodiments of the present invention can use other languages and can consider assumptions and/or constraints as appropriate to those languages. In addition, some embodiments of the present invention may use more than two query languages. Also, some of the assumptions and/or constraints discussed below for SQL and/or MDX may also apply to various other languages.

As related to SQL and MDX, one assumption is that SQL queries are faster and more scalable than MDX queries. A second assumption is that MDX queries that work by axis generally run faster than queries that work by cell (i.e., using fully qualified tuples). However, this may not be true, for example, when trying to retrieve a small number of generically unrelated cells. In addition, because fully qualified tuples need to specify the members of all dimensions for each individual cell, queries that work by axis can be represented with a shorter string than that required to define a list of tuples.

A third assumption is that MDX queries that use the NonEmptyCrossJoin (i.e., a function that returns a set containing the cross product of one or more sets, excluding empty tuples and tuples without associated fact table data) on no more than two axes are typically faster than regular multi-axis queries or queries that use CrossJoin (i.e., a function that returns the cross product of two or more specified sets). Also, queries that use tuples are generally the slowest when accessing a large number of cells.

A fourth assumption is that a few large MDX queries tend to run faster than many small queries, unless the queries are so big that, for example, they take all available memory. Accordingly, it is typically only worth breaking a query into many smaller queries if one of these queries can be converted to the format of a faster language, such as SQL. However, breaking a query into more than three or four queries may end up being slower. Therefore, in some embodiments, a tradeoff between the type of query and the number of queries must be established.

There are also constraints of query languages that may be considered. If using SQL, for example, one constraint is that OLAP (On Line Analytical Processing) PARENT members cannot be read using SQL queries. Another constraint is that formula members (e.g., members calculated by a dimension formula), cannot be read using SQL queries. Additionally, Non-stored measures (e.g., measures other than the one matching the absolute value of SignedData), cannot be read using SQL queries.

In some embodiments, constraints related to MDX must also be considered. One constraint is that formula members, (e.g., members calculated by a dimension formula), or parents of formula members, cannot be read using MDX queries containing NonEmptyCrossJoin functions, because this function will not be able to find them. A second constraint is that calculated measures, (e.g., measures other than the one matching the absolute value of signed data), cannot be one of the parameters of a NonEmptyCrossJoin function, because this function will not be able to find them; however they can still be used to restrict the returned information by moving them to the "where" clause of the query.

Figure 3:
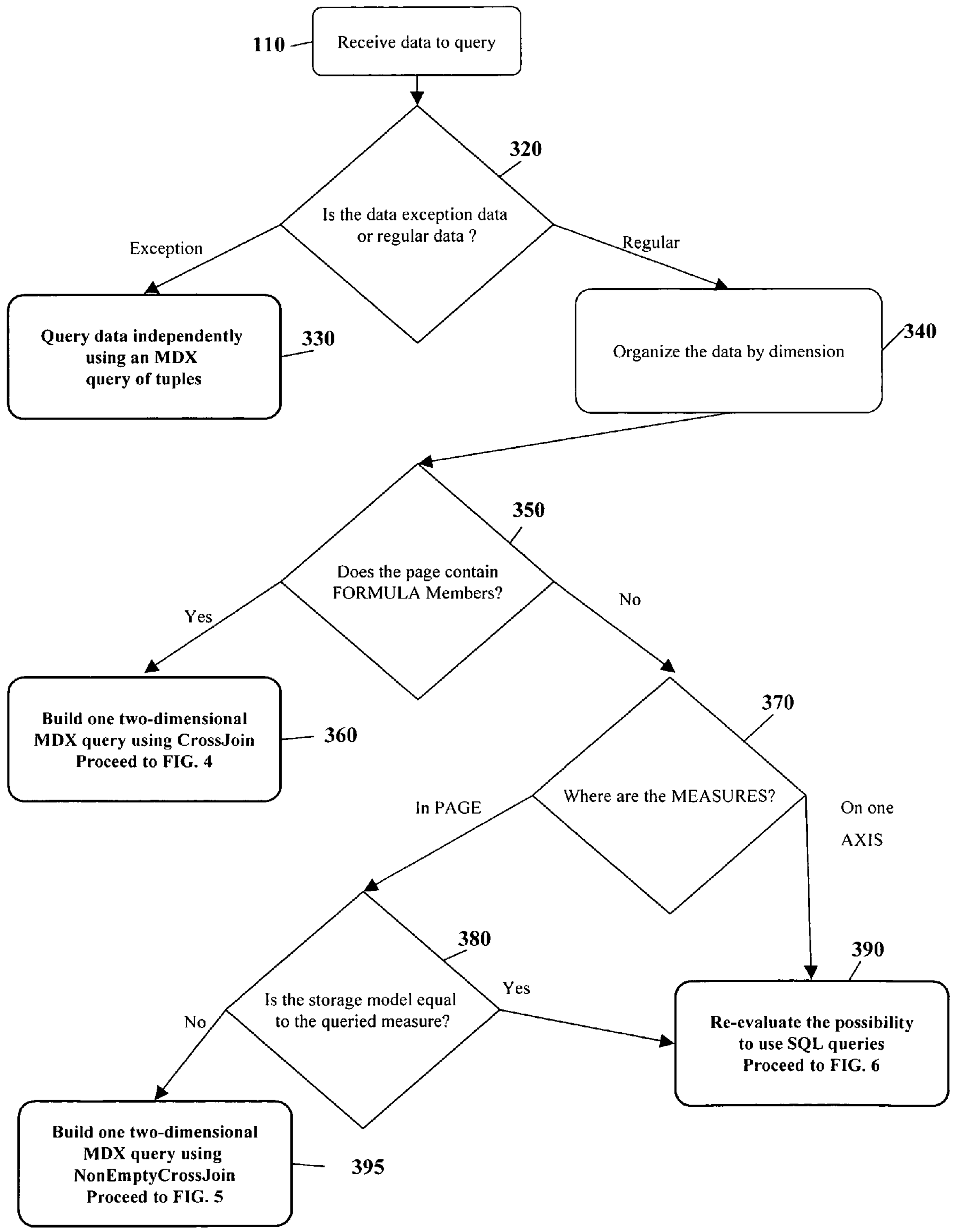
FIG. 3 is a simplified illustration of a method for structuring database queries according to some embodiments of the present invention which can be used with SQL and MDX.

In some embodiments of the present invention, as illustrated in FIG. 3, when data to query is received, at 110, the data can be separated, at 320, into two sets, referred to, as regular data and exception data. In some embodiments, for example, the first set, can be data whose current view is defined by row, column, and page and the second set can be data whose current view is defined on a cell-by-cell basis. In other embodiments, for example, the first set can be data whose key is defined by row, column, and page and the second set can be data whose key is defined on a cell-by-cell basis, or possibly not defined at all. In yet other embodiments, for example, the first set can be data which has been constrained by a number of dimensions and/or query terms and the second set can be data that is defined on a cell-by-cell basis.

Typically, exception cells are few, and may redefine the members to query on any dimension. For this reason it is generally more efficient to simply query this data independently from the data defined by axis and page. Therefore, in embodiments, using, for example, SQL and MDX, exception data can be queried with an MDX query, 330, that defines one tuple for each one of these exception cells. In some embodiments, these exception cells can be defined by the user using a CellKeyRange and can redefine the members to query on any dimension. In some cases, a request for multi-dimensional data can have a representation where some dimensions are specified by axis (e.g., a report where products are listed in columns and customers are listed in rows). In such an example, exception cells are those where the key of a cell cannot be predicted simply by looking at the axis (e.g., it cannot be determined that because a cell is in a certain column, it must be a certain product). Instead, the specific intersection must be considered on a cell-by-cell basis (e.g., in row 7, column 3, data from a certain product is located).

The following discussion concentrates on the systems and methods used to query the first set of data (i.e. data that is defined by row, column and page), which represent the majority of cases. In some embodiments, data can be organized by dimension, at 340. For example, some embodiments can create a list of members that need to be queried for each dimension. This may create a region of data that is bigger than the actual requested data, however, it can allow generation of smaller and faster queries.

For example, in some embodiments, if a report has two columns, one reading data from ACTUAL, 2005.DEC and the other for BUDGET, 2006.DEC, the resulting query retrieves data for ACTUAL and BUDGET for both periods 2005.DEC and 2006.DEC. It can do this even if, for example, 50% of the retrieved cells will not be used. This query is expected to perform more efficiently than two separate queries, each one retrieving the exact combination of the category and time period requested by each column.

In some embodiments, the page members can be analyzed. This can start, for example, at 350, with a check of whether the page contains FORMULA members (i.e. members that have a DIMENSION FORMULA attached). If the page contains FORMULA members, no SQL query is allowed and no NonEmptyCrossJoin function is allowed in the MDX queries. One two-dimensional MDX query can be issued, at 360, using CrossJoin according to the sequence described below and illustrated in FIG. 4.

Figure 4:
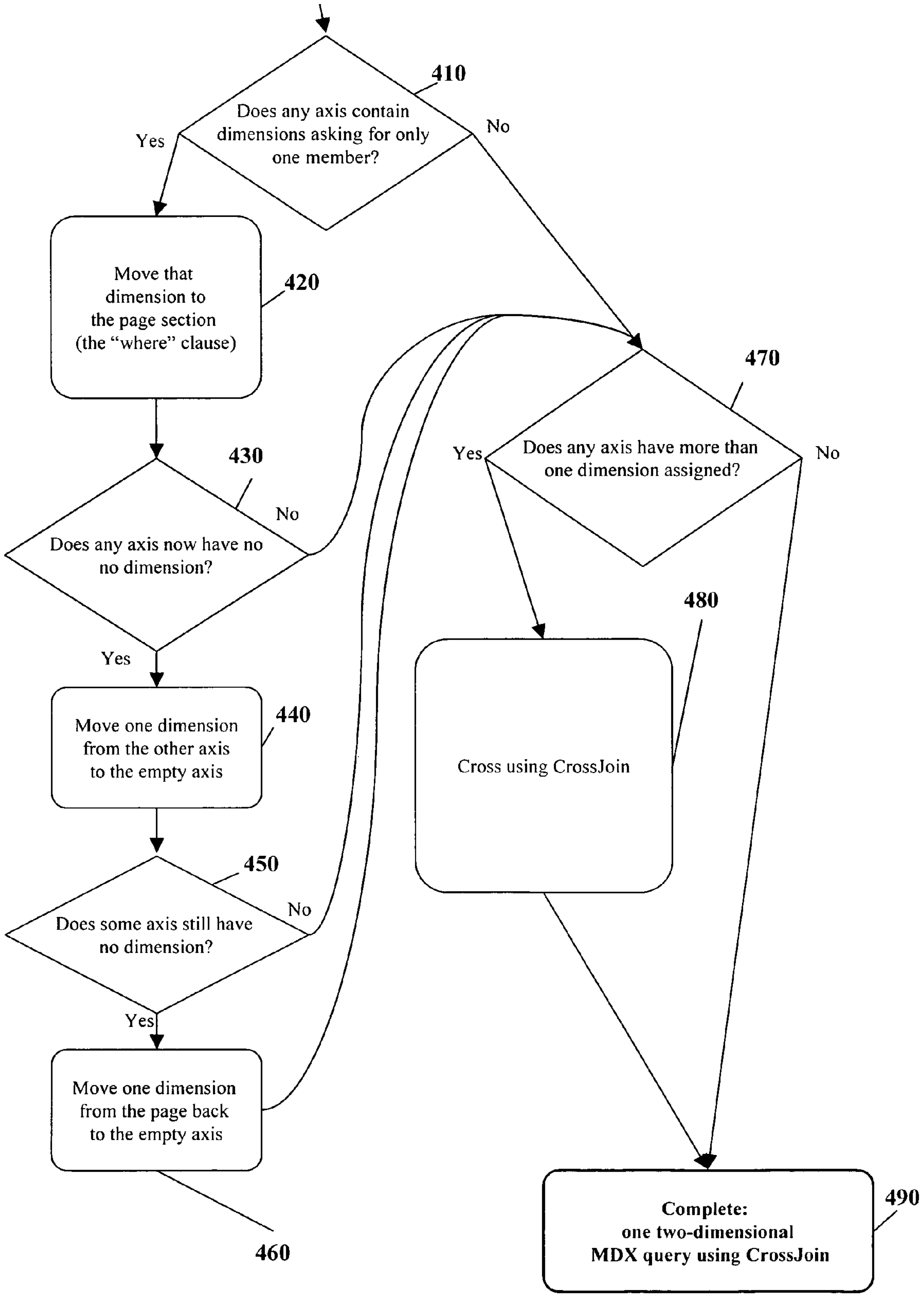
FIG. 4 is a simplified illustration of a method for generating MDX queries using CrossJoin according to some embodiments of the present invention.

Referring to FIG. 4, in building the two-dimensional MDX query using CrossJoin, some embodiments can improve and/or optimize the assignment of the dimension to the axis. This can be done, for example, by rearranging the assignment of the dimensions among the various axes. However, this may result, at least temporarily with at least one axis being empty. For example, referring to FIG. 4, in one embodiment the axes are checked, at 410, to determine whether any axis contains dimensions requesting only one member. If so, that dimension can be moved, at 420, to the page section, (e.g., the "where" clause of an MDX query). If not, in this example, the system can move on to 470, which will be described later. If, at 430, due to moving a dimension to the page section, an axis ends up having no dimension, one dimension from another axis can be moved to the empty axis, at 440. If not, the system can proceed to 470. If there is still an axis without a dimension, at 450, a dimension from the page can be moved back to empty axis, at 460. In either case, the systems proceeds to 470.

A check, at 470, can be done to determine if an axis has more than one dimension assigned. If so, the dimensions can be crossed using as many CrossJoin functions as required, at 480. If not, or after performing the CrossJoins, one two-dimensional MDX query using CrossJoin can continue to be built, at 490. An example of a generated query using CrossJoin is illustrated, at 1210, in FIG. 12.

Returning to the check, at 350 (FIG. 3), of whether the page contains FORMULA members, if there are none, the system can proceed down the "No" branch. In this case, the system checks where the Measures are located, at 370. For example, if the measures are located in PAGE (e.g., if the cells have the same member for a given dimension), the application storage model can be compared, at 380, for example, a comparison of PERIODIC versus YTD (year to date).

Figure 5:
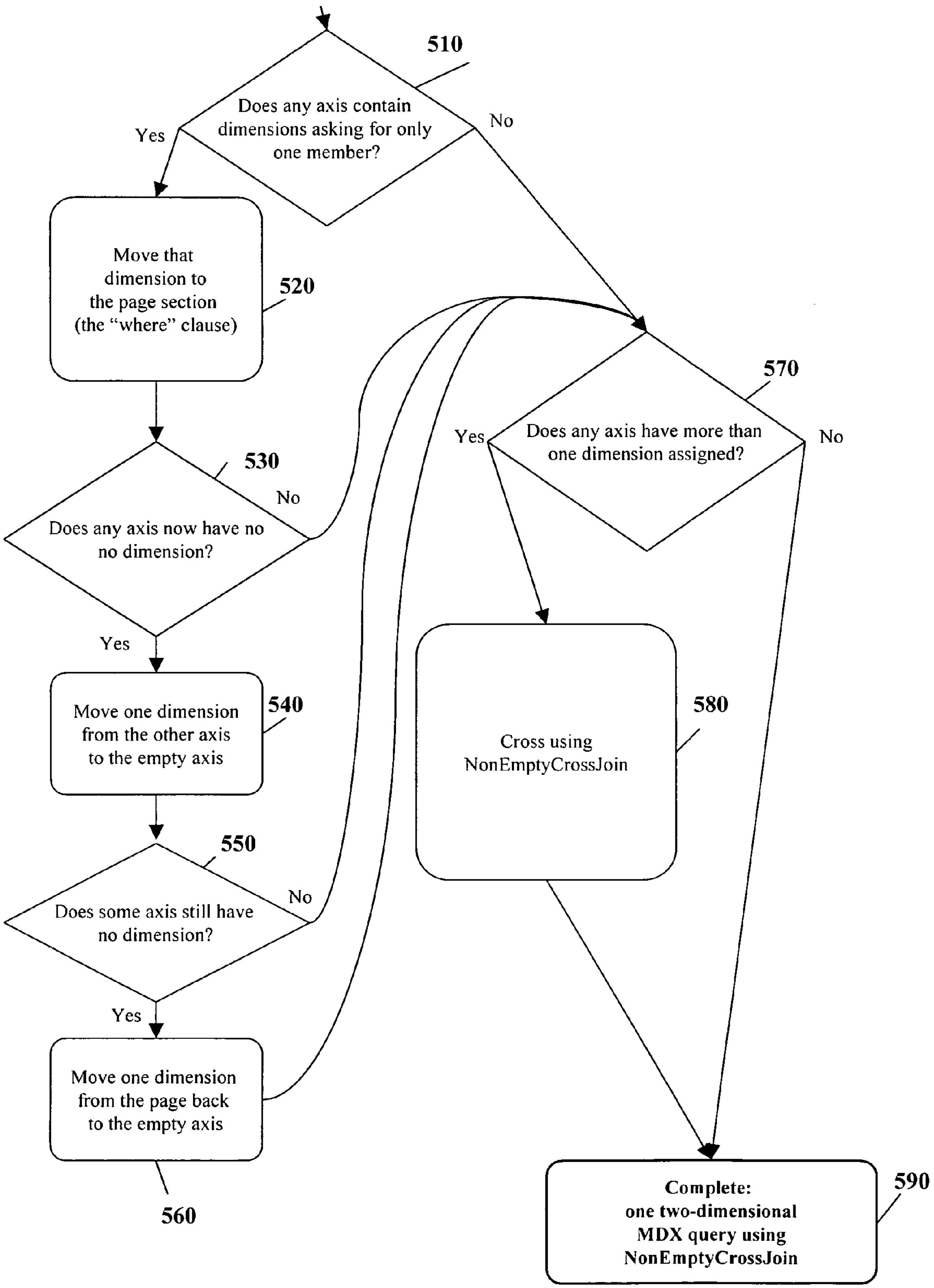
FIG. 5 is a simplified illustration of a method for generating MDX queries using NonEmptyCrossJoin according to some embodiments of the present invention.

If the storage model is not equal to the queried measure, for example, if the storage is PERIODIC but the requested mode is QTD, no SQL query is allowed but NonEmptyCrossJoin is allowed in MDX queries. The system can proceed to build one two-dimensional MDX query using NonEmptyCrossJoin as illustrated in FIG. 5. However, if the storage model is equal to the queried measure, for example, both are PERIODIC, the system can proceed to reevaluate, at 390, the possibility of using SQL queries as in FIG. 6, which is described later.

Returning to the step of checking the MEASURE, at 370, a system can proceed down the right branch if the MEASURES are on one AXIS. Since, in this case, it is unlikely that more than one measure must be queried, a loop can be set up that scans each requested measure. For each of the requested measures, the system can continue, at 390, re-evaluating the possibility of using SQL queries, as illustrated in FIG. 6.

The example illustrated in FIG. 5 is similar to the example illustrated in FIG. 4. However, if needed, the dimensions can be crossed using a NonEmptyCrossJoin function, at 580. That is, the method can start at 510, and proceed through some of 520, 530, 540, 550, and 560, branching to 570 in the same way as in FIG. 4 and as described above. To ensure that the NonEmptyCrossJoin retrieves the correct data, the dimension members used in the OPPOSITE axis can be added to the NonEmpyCrossJoin to determine which members of the cross-joined sets are to be considered. In other words, the membersets of all non-page dimensions are called in both axes, however, the sets of the current axis are only numbered in the CrossJoin Set Count parameter. A NonEmptyCrossJoin can be used, at 580, to complete one two-dimensional MDX query at 590. An example, at 1220, of a generated query using NonEmptyCrossJoin is illustrated in FIG. 12.

Figure 6:
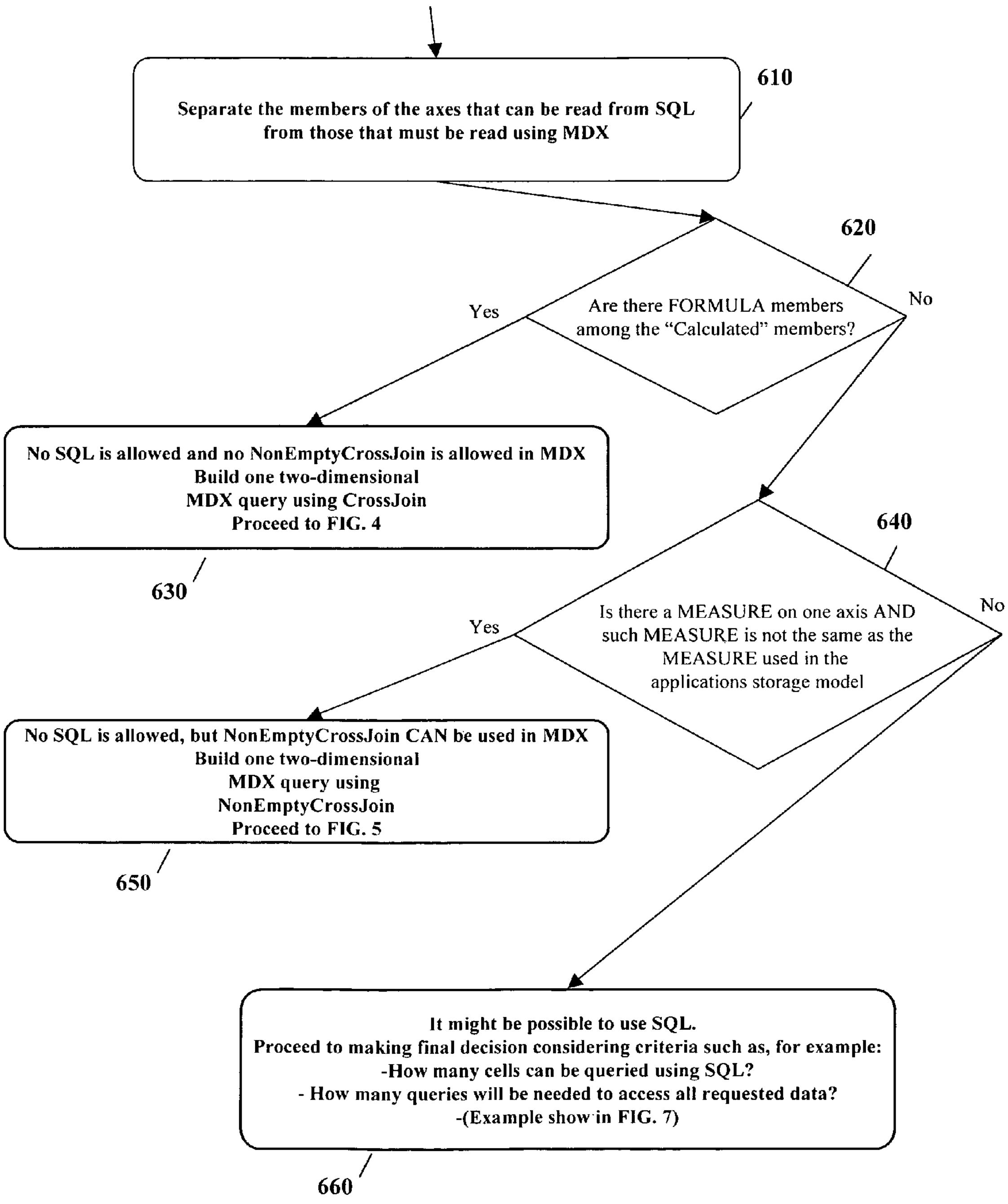
FIG. 6 is another simplified illustration of a method for structuring database queries according to some embodiments of the present invention which can be used with SQL and MDX.

If a system reaches 390, it may access requested information using an SQL query as in FIG. 6. However, in some embodiments, the decision may not yet be final because it may be useful to continue analysis. Some embodiments can separate, at 610, the members of the axes that can be read from SQL (e.g., the input members), from those that must be read using MDX (e.g., the calculated members).

Then, at 620, there can be a check of whether there are FORMULA members among the calculated members in any axis. If there are FORMULA members, no SQL is allowed and no NonEmptyCrossJoin is allowed in MDX, at 630. Some embodiments can proceed with one MDX query as illustrated in FIG. 4 and as described above.

If there are no FORMULA members, a check, at 640, of whether there is a MEASURE on one axis and whether that measure is not the same as the measure used in the application's storage model, can be performed. If this is true, no SQL is allowed, but NonEmptyCrossJoin can be used in MDX, at 650. Some embodiments can proceed with one MDX query as illustrated in FIG. 5 and as described above. Another consideration can be whether there is no FORMULA member in any dimension and the MEASURE is the same as the measure in the application's storage model. In this case, SQL may be used.

Figure 7:
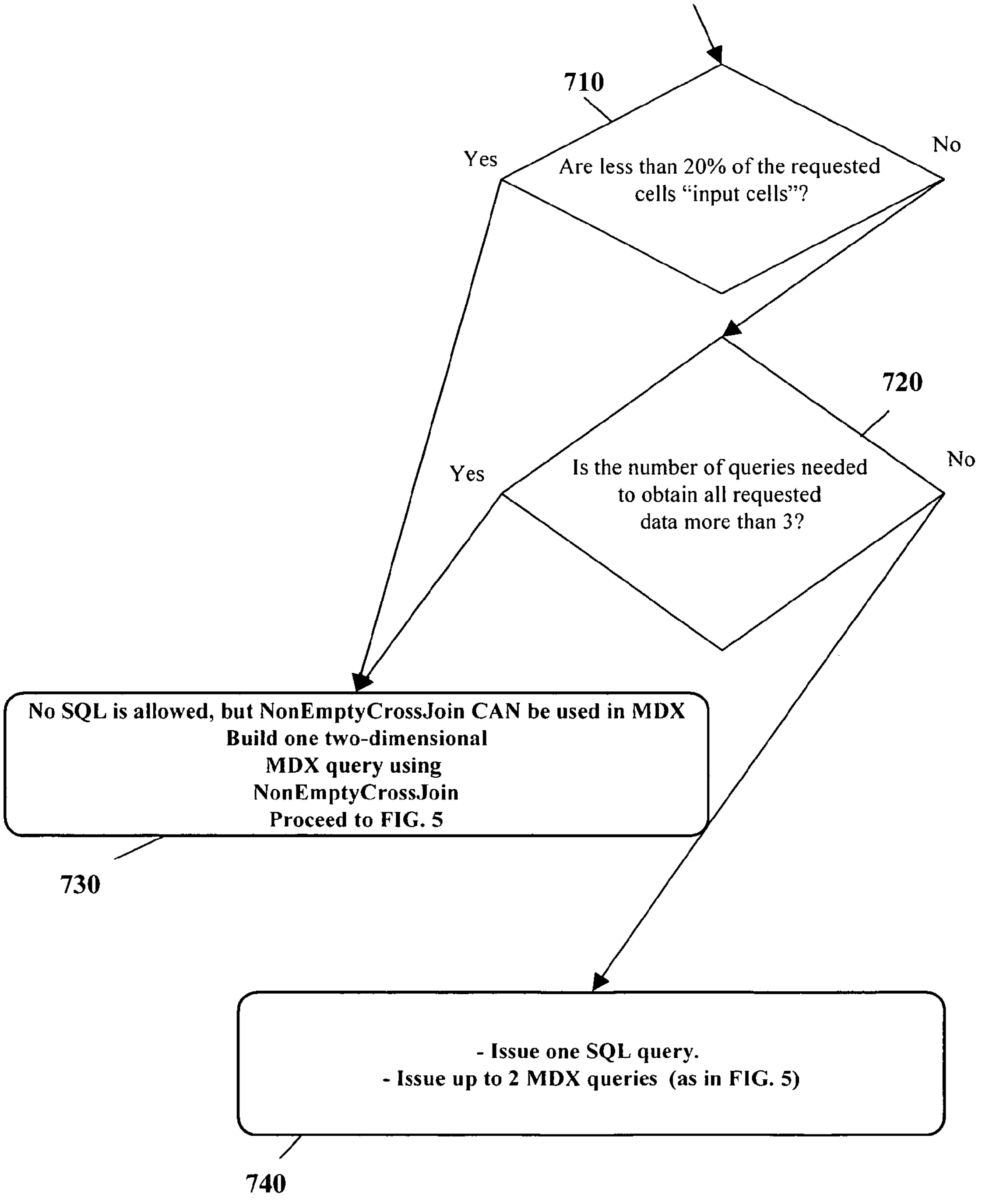
FIG. 7 is simplified illustration of a method for structuring database queries based on performance considerations according to some embodiments of the present invention which can be used with SQL and MDX.

The system can then proceed to making a final decision, at 660, or directly to issuing a query or queries. Whether further analysis is made can depend, for example, on the system and/or languages being used. Various criteria can be used and the criteria can be, for example, either hard coded or user definable. For example, some embodiment consider how many cells can be queried using SQL and how many cells will be needed to access all the requested data. For example, some systems can use the following criteria. As illustrated in FIG. 7:

1. If less than 20% of the requested cells are input cells, at 710, SQL is not used and one MDX query can be issued, at 730, as illustrated in FIG. 5;

2. If 20% or more of the requested cells are input cells, but the number of queries needed to obtain all requested data is more than three, at 720, SQL is not used and one MDX query can be issued, at 730, as illustrated in FIG. 5; and 3. If more than 20% of the requested cells are input cells and the number of queries needed to obtain all requested data is 3 or less, one SQL query and up to 2 MDX queries can be issued, at 740, each one of the latter can use NonEmptyCrossJoin as illustrated in FIG. 5.

In building a query or queries, it may be necessary to ensure that the information being requested is visible to language used in attempting to obtain that information. For example, because some data is not visible to an SQL query, it may be necessary to isolate this data and make sure that it is retrieved using an MDX query. To build the correct queries, an embodiment can proceed as follows:

The members of the axes that can be read from SQL (e.g., the input members) can be separated from those that must be read using MDX (e.g., the calculated members). All possible combinations of input members and calculated members that can be intersected on the two axes can be built.

For example, if the axes of a report have one dimension each, the possible combinations are, in the form of (Dimension 1, Dimension 2): (Input, Input), (Input, Calculated), (Calculated, Input), and (Calculated, Calculated) as shown 810 in FIG. 8.

The report might ask for, for example,

| | |
|---|---|
| In ROWS: | ACCOUNT: CASH, ACCREC, TOTASSETS |
| In COLUMNS: | ENTITY: ITALY, FRANCE, EUROPE |

Some embodiments of the present invention separate the ACCOUNTs in:

| | |
|---|---|
| INPUT: | CASH, ACCREC |
| CALCULATED: | TOTASSETS |

and the ENTITIES in:

| | |
|---|---|
| INPUT: | ITALY, FRANCE |
| CALCULATED: | EUROPE |

The valid intersections are illustrated at 820. The intersection of the input entries of Dimension 1 and Dimension 2, which consists only of inputs, is the intersection that can be read using an SQL query.

Often, not all possible intersections contain members in all dimensions. If at least one dimension has no member in a given intersection, the entire intersection can be ignored. As discussed above, if the valid intersections are, for example, more than three, some embodiments can stop trying to form an SQL query, and can combine everything into one MDX query.

In the above example, where all four intersections have members in both dimensions, the number of required queries would be four, which exceeds the maximum number of three, accordingly, in such an embodiment, simply one MDX query would be issued.

Some embodiments of the present invention also provide optimization methods that can, for example, optimize the above example. For example, the last two combinations do not need to be kept separated. By combining them in the combination show in FIG. 8, at 830, the number of queries can be reduced to three instead of four, and the data can be retrieved with one SQL and two MDX queries.

It is also possible to reduce, for example, the possible combinations to only five in an example where four dimensions are being intersected. As illustrated in FIG. 9, the query numbers 3 and 4 can be combined into one, by selecting all members in dimension 4. Similarly the queries from 5 to 8 can be combined into one, by selecting all members in dimensions 3 and 4, and the queries from 9 to 16 can be combined into one, by selecting all members in dimensions 2, 3 and 4.

Two illustrative examples of building queries according to some embodiments will now be described. FIG. 10 A, illustrates one embodiment of the present invention that has received a request to populate a grid of data, at 1011, defined as follows:

The ENTITY dimension varies by COLUMN. Column 1 should read data from entity SALESFRANCE, column 2 from entity SALESITALY and column 3 from entity SALESEUROPE.

The ACCOUNT dimension varies by ROW. Row 1 should read data from account CASH, row 2 from account ACCREC and row 3 from account TOTALCURRENTASSETS.

All other dimensions have a value assigned in the PAGE KEY, 1010, which means they do not change by column, row or cell.

Decision process, as applied to this example:

Split the data between regular and exceptions.

In this case there are no exceptions because nothing has been defined at the individual cell level (only at the column, row, or page level). If there were any exceptions, they could have been resolved by branching into a separate decision path. Therefore, some embodiments can proceed to handle the regular data.

Analyze the PAGE members:

Check the MEASURES dimension:

All dimensions assigned to the page query input members, (No FORMULA members nor PARENT-level members), so SQL queries are still possible. Continue to evaluate the report.

The MEASURES dimension is in PAGE, and is PERIODIC. Since in this application the data is stored as PERIODIC, SQL queries are possible. Continue to evaluate the report and consider the possibility of using SQL.

Analyze the ROW and COLUMN members:

Separate the members of the axes that can be read from SQL (the Input members) from those that must be read using MDX (the Calculated members). Shown here:

In Columns: SALESITALY and SALESFRANCE are INPUT and SALESEUROPE is a CALCULATED PARENT (no FORMULA member).

In rows: CASH and ACCREC are INPUT and TOTALCURRENTASSET is a CALCULATED PARENT (no FORMULA member).

Therefore: no FORMULA member, the MEASURES (PERIODIC) match the storage model: Continue to evaluate the report.

The number of INPUT cells is four out of a total of nine: this is more than 20%, so some embodiments can try and split the query in one SQL query to read the INPUT cells and no more than two MDX queries to read the CALCULATED parent cells (if more than two queries are required, this embodiment will not use SQL).

Determine how many MDX queries are needed. In this case a solution is:

SQL query: CASH, ACCREC for SALESITALY and SALESFRANCE

MDX query 1: CASH, ACCREC for SALESEUROPE

MDX query 2: TOTALCURRENTASSETS for SALESITALY, SALESFRANCE and SALESEUROPE

These are essentially the following intersections:

All row inputs against all column inputs (SQL)

All row inputs against all calculated columns (MDX query 1)

All calculated rows against all columns (input+calculated: MDX query 2)

With these 3 queries this embodiment of the present invention can get all the values it needs, so some embodiments proceed to issue the query of the log file of FIG. 10 B, at 1020.

The example data grid, at 1110, of FIG. 11 A can be populated in a manner similar to that the example illustrated in FIG. 10 A and FIG. 10 B. The members of 1110 are:

In COLUMNS:

ENTITY: SALEFRANCE, SALESITALY, SALESEUROPE

TIME: 2006.JAN, 2006.FEB, 2006.MAR, 2006.Q1

In ROWS:

ACCOUNT: CASH, ACCREC, TOTALCURRENTASSETS, TOTALASSETS

CURRENCY: USD, EUR, LC

The decision process of this example follows the same path as in the example of FIGS. 10 A and B, however, when the ROW and COLUMN members are evaluated, it is determined that there are only 12 input cells out of a total of 144. In this case it is decided that there are too few cells that would benefit from the efficiency of an SQL query and, since there are NO FORMULA MEMBERS, but all calculated members are PARENT members, the NonEmptyCrossJoin query as show in the log file of FIG. 11 B, at 1120, can be built using some embodiments of the present invention.

Figure 13:
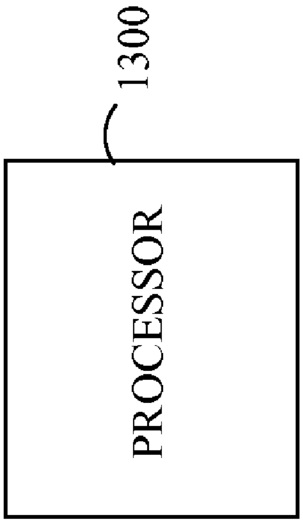
FIG. 13 illustrates a processor that is provided in some embodiments.

FIG. 13 illustrates a processor 1300 that is provided in some embodiments. The processor: forms at least one query of a first query language selected from a set of query languages and based at least in part on a set of constraints of the first query language to obtain at least part of desired information; and forms at least one query of at least one additional query language from the set of query languages and based at least in part on a set of constraints of the at least one additional query language to obtain at least part of the desired information; wherein the at least one query of the first query language and the at least one query of the at least one additional language obtain at least all of the desired information.

Figure 14:
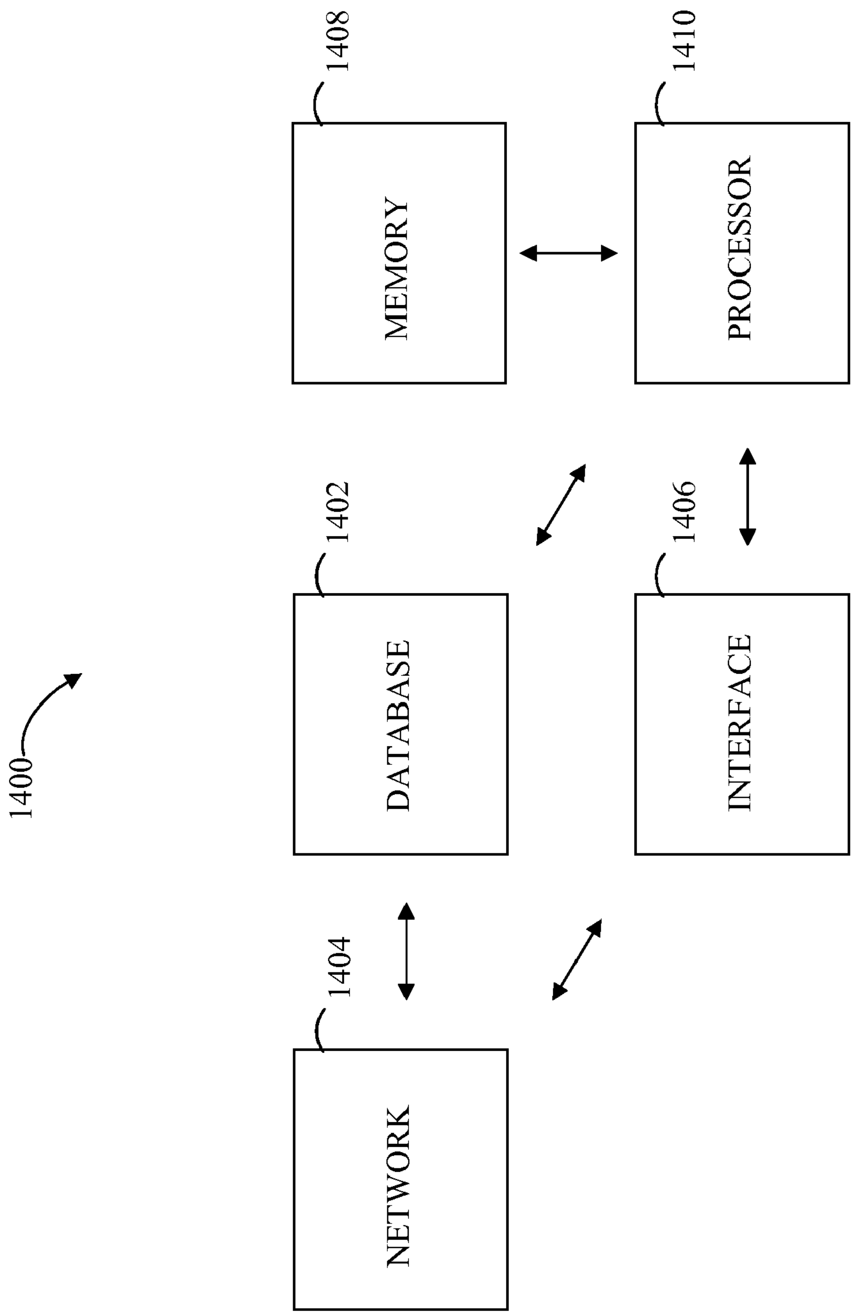
FIG. 14 illustrates a database system that is provided in some embodiments.

FIG. 14 illustrates a database system 1400 that is provided in some embodiments. The database system 1400 includes a database 1402 in communication with a network 1404; an interface 1406 in communication with the network 1404; a memory 1408; and a processor 1410 in communication with the memory 1408, the interface 1406, and the database 1402; wherein the processor 1410: forms at least one query of a first query language selected from a set of query languages and based at least in part on a set of constraints of the first query language to obtain at least part of desired information; and forms at least one query of at least one additional query language from the set of query languages and based at least in part on a set of constraints of the at least one additional query language to obtain at least part of the desired information; wherein the at least one query of the first query language and the at least one query of the at least one additional language obtain at least all of the desired information.

Although the present invention has been described and illustrated in the foregoing exemplary embodiments, it is understood that the present disclosure has been made only by way of example, and that numerous changes in the details of implementation of the invention may be made without departing from the spirit and scope of the invention. As described hereinabove, the present invention allows users to generate queries. It is to be understood that the invention is not limited in its application to the details of construction and to the arrangements of the components set forth in the following description or illustrated in the drawings. The present invention is capable of other embodiments and of being practiced and carried out in various ways. For example, various languages and their associated structures can be used with the systems and methods of the present invention. SQL and MDX are merely used to illustrate some embodiments of the systems and methods of the present invention. Also, in some embodiments, depending upon, for example, the languages being used, the various actions performed in, for example, FIG. 3, FIG. 6, and/or FIG. 7 may not be necessary. Moreover, certain features which are well known in the art were not described in detail in order to avoid complication of the subject matter of the present invention. In addition, it is understood that features in one embodiment may be combined with features in other embodiments of the invention. Also, the phraseology and terminology employed herein are for the purpose of description and should not be regarded as limiting.

What is claimed is:

1. A method for querying a database to obtain desired information, comprising:

forming, using a processor of a system, at least one query of a first query language selected from a set of query languages and based at least in part on a set of constraints of the first query language to obtain at least part of the desired information;

forming, using the processor, at least one query of at least one additional query language from the set of query languages and based at least in part on a set of constraints of the at least one additional query language to obtain at least part of the desired information; and separating, using the processor, input members from calculated members, wherein the input members are queried with the least one query in the first query language and the calculated members are queried with the at least one query in the at least one additional query language;

wherein the at least one query of the first query language and the at least one query of the at least one additional language obtain at least all of the desired information.

2. The method of claim 1, further comprising determining, using the processor, whether more than a specified percentage of requested cells can be retrieved more efficiently using a specific query language selected from the set of query languages; and determining, using the processor, whether less than a specified number of queries are needed to obtain the desired information, wherein at least one of the selection of query languages and the number of queries formed is based at least in part on at least one of the specified percentage and the specified number.

3. The method of claim 2, wherein at least one of the specified percentage and specified number are variables.

4. The method of claim 2, wherein the determining whether more than a specified percentage of requested cells can be retrieved more efficiently using a specific query language selected from the set of query languages is based on whether the cells are input cells.

5. The method of claim 1, wherein the first query language is SQL.

6. The method of claim 1, wherein the at least one additional query language is at least one of MDX and DML.

7. The method of claim 1, wherein the first query language is SQL and the at least one additional query language is MDX.

8. The method of claim 1, wherein the constraints of the first query language include at least one of the presence of formula members in a page, whether every cell has the same member for a given dimension, and whether the storage model of the database is the same as the queried measure of the desired information.

9. The method of claim 1, further comprising:

determining, using the processor, whether more than a specified percentage of requested cells can be retrieved more efficiently using a specific query language selected from the set of query languages.

10. The method of claim 9, further comprising:

determining, using the processor, whether less than a specified number of queries are needed to obtain the desired information; and wherein the set of constraints of the first query language comprises:

forming one query of the at least one query of the first query language to obtain at least part of the at least part of the desired information only if:

it is determined that more than the specified percentage of requested cells can be retrieved more efficiently using the first query language; and it is determined that less than a specified number of queries are needed to obtain the desired information.

11. The method of claim 10, wherein the first query language is SQL.

12. The method of claim 10, wherein the at least one additional query language is MDX.

13. The method of claim 10, wherein the first query language is SQL and the at least one additional query language is MDX.

14. The method of claim 13, wherein the specified percentage is 20%.

15. The method of claim 13, wherein the specified number is 3.

16. The method of claim 13, wherein the specified percentage is 20% and the specified number is 3.

17. A database system comprising:

a database in communication with a network;

an interface in communication with the network;

a memory; and a processor in communication with the memory, the interface, and the database; wherein the processor:

forms at least one query of a first query language selected from a set of query languages and based at least in part on a set of constraints of the first query language to obtain at least part of desired information;

forms at least one query of at least one additional query language from the set of query languages and based at least in part on a set of constraints of the at least one additional query language to obtain at least part of the desired information; and separates input members from calculated members, wherein the input members are queried with the least one query in the first query language and the calculated members are queried with the at least one query in the at least one additional query language;

wherein the at least one query of the first query language and the at least one query of the at least one additional language obtain at least all of the desired information.

18. The database system of claim 17, where the processor further determines whether more than a specified percentage of requested cells can be retrieved more efficiently using a specific query language selected from the set of query languages; and determines whether less than a specified number of queries are needed to obtain the desired information, wherein at least one of the selection of query languages and the number of queries formed is based at least in part on at least one of the specified percentage and the specified number.

19. The database system of claim 18, wherein at least one of the specified percentage and specified number are variables.

20. The database system of claim 18, wherein the determining whether more than a specified percentage of requested cells can be retrieved more efficiently using a specific query language selected from the set of query languages is based on whether the cells are input cells.

21. The database system of claim 17, wherein the first query language is SQL.

22. The database system of claim 17, wherein the at least one additional query language is at least one of MDX and DML.

23. The database system of claim 17, wherein the first query language is SQL and the at least one additional query language is MDX.

24. The database system of claim 17, wherein the constraints of the first query language include at least one of the presence of formula members in a page, whether every cell has the same member for a given dimension, and whether the storage model of the database is the same as the queried measure of the desired information.

25. The database system of claim 17, where the processor further
determines whether more than a specified percentage of requested cells can be retrieved more efficiently using a specific query language selected from the set of query languages.

26. A database system comprising:
means for forming at least one query of a first query language selected from a set of query languages and based at least in part on a set of constraints of the first query language to obtain at least part of desired information;
means for forming at least one query of at least one additional query language from the set of query languages and based at least in part on a set of constraints of the at least one additional query language to obtain at least part of the desired information; and
means for separating input members from calculated members, wherein the input members are queried with the least one query in the first query language and the calculated members are queried with the at least one query in the at least one additional query language;
wherein the at least one query of the first query language and the at least one query of the at least one additional language obtain at least all of the desired information.

27. The database system of claim 26, further comprising:
means for determining whether more than a specified percentage of requested cells can be retrieved more efficiently using a specific query language selected from the set of query languages; and
means for determining whether less than a specified number of queries are needed to obtain the desired information, wherein at least one of the selection of query languages and the number of queries formed is based at least in part on at least one of the specified percentage and the specified number.

28. The database system of claim 27, wherein at least one of the specified percentage and specified number are variables.

29. The database system of claim 27, wherein the means for determining whether more than a specified percentage of requested cells can be retrieved more efficiently using a specific query language selected from the set of query languages is based on whether the cells are input cells.

30. The database system of claim 26, wherein the first query language is SQL.

31. The database system of claim 26, wherein the at least one additional query language is at least one of MDX and DML.

32. The database system of claim 26, wherein the first query language is SQL and the at least one additional query language is MDX.

33. The database system of claim 26, wherein the constraints of the first query language include at least one of the presence of formula members in a page, whether every cell has the same member for a given dimension, and whether the storage model of the database is the same as the queried measure of the desired information.

34. The database system of claim 26, further comprising:
means for determining whether more than a specified percentage of requested cells can be retrieved more efficiently using a specific query language selected from the set of query languages.

* * * * *